United States Patent
Krishnan et al.

(10) Patent No.: US 9,527,451 B2
(45) Date of Patent: Dec. 27, 2016

(54) RETRACTABLE CARGO COVER WITH INTEGRAL STORAGE COMPARTMENT

(71) Applicant: FORD GLOBAL TECHNOLOGIES, LLC, Dearborn, MI (US)

(72) Inventors: Venkatesh Krishnan, Canton, MI (US); Brandon Buckhalt, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/707,228

(22) Filed: May 8, 2015

(65) Prior Publication Data

US 2016/0325686 A1  Nov. 10, 2016

(51) Int. Cl.
*B60R 5/04* (2006.01)
*B60R 7/02* (2006.01)
*B60R 7/00* (2006.01)

(52) U.S. Cl.
CPC .............. *B60R 5/047* (2013.01); *B60R 7/005* (2013.01)

(58) Field of Classification Search
CPC ........... B60R 5/04; B60R 5/044; B60R 5/045; B60R 5/047; B60R 7/005
USPC ...................... 296/37.7, 37.8, 37.16, 100.01, 100.11, 296/136.03
See application file for complete search history.

(56) References Cited

U.S. PATENT DOCUMENTS

| | | | |
|---|---|---|---|
| 5,372,289 A | 12/1994 | Dachicourt | |
| 5,685,592 A * | 11/1997 | Heinz | B60N 3/10 224/925 |
| 6,039,378 A | 3/2000 | Bailey | |
| 6,406,083 B2 | 6/2002 | Bharj et al. | |
| 6,821,600 B1 | 11/2004 | Henson | |
| 6,890,015 B2 | 5/2005 | Carlsson et al. | |
| 7,028,872 B2 * | 4/2006 | Lobanoff | B60R 7/02 211/123 |
| 7,318,617 B1 | 1/2008 | Scotton | |
| 7,488,024 B1 | 2/2009 | Medlar | |
| 7,758,092 B2 * | 7/2010 | Kolpasky | B60R 5/045 296/24.43 |
| 7,762,602 B2 | 7/2010 | Bohlke et al. | |
| 7,806,453 B2 | 10/2010 | Aebker | |
| 7,934,761 B2 | 5/2011 | Buehl et al. | |
| 2011/0101736 A1 | 5/2011 | Sogame | |

FOREIGN PATENT DOCUMENTS

| | | | | |
|---|---|---|---|---|
| DE | 102004034712 A1 * | 2/2006 | | B60R 7/005 |
| DE | 102005051732 A1 | 5/2007 | | |
| DE | 102010046635 B4 | 11/2014 | | |
| EP | 1382490 A1 | 1/2004 | | |
| JP | 11123988 | 5/1999 | | |

(Continued)

OTHER PUBLICATIONS

English machine translation of DE102010046635.

(Continued)

*Primary Examiner* — Jason S Daniels
(74) *Attorney, Agent, or Firm* — Vichit Chea; King & Schickli PLLC

(57) ABSTRACT

A cargo cover apparatus includes a housing, a cover retracting mechanism held in the housing and a cargo cover. The cargo cover incorporates an integral storage compartment. The cargo cover is selectively displaceable between a storage position retracted within the housing and a cargo concealing position extending from the housing.

11 Claims, 4 Drawing Sheets

(56) References Cited

FOREIGN PATENT DOCUMENTS

| | | |
|---|---|---|
| JP | 2002114103 A | 4/2002 |
| JP | 2006062485 | 3/2006 |
| KR | 19980039165 U | 9/1998 |
| WO | 2007104563 A1 | 9/2007 |

OTHER PUBLICATIONS

English machine translation of DE102005051732.
English machine translation of EP1382490A1.
English machine translation of JP2006062485.
English machine translation of JP11123988.
English machine translation of JP2002114103A.
English machine translation of KR19980039165U.

\* cited by examiner

RETRACTABLE CARGO COVER WITH INTEGRAL STORAGE COMPARTMENT

TECHNICAL FIELD

This document relates generally to the vehicle equipment field and, more particularly, to a retractable cargo cover with an integral storage compartment.

BACKGROUND

Many sport utility vehicles (SUVs) and crossover utility vehicles (CUVs) are equipped with a liftgate including a separately operable left glass which is easier to manipulate and may be opened without opening the lift gate to allow one to load/unload small items, such as groceries, into/from the cargo area behind the rear seat. However, many such vehicles are also equipped with a cargo cover to conceal the cargo area from view. As a consequence, when one opens the lift glass, one must also release/open the cargo cover to gain access to the cargo area. The ergonomic reach is not very easy and may even be difficult or impossible for shorter operators. Further, the operator's clothes may become dirty leaning against the tailgate during the loading/unloading operation.

The storing of small grocery items in the storage area, may also be problematic. While storage units or dividers are often provided, many times it is still possible for some groceries like bread, eggs, light bulbs and other fragile items to become damaged. Thus, a need clearly exists for not only compartmentalization of the storage area but also the provision of a storage compartment that is more easily reached.

This document relates to a new and improved cargo cover that, while being retractable, also offers an integral storage compartment easily accessed through the open lift glass and even by rear seat passengers with minimal ergonomic difficulty.

SUMMARY

In accordance with the purposes and benefits described herein, a cargo cover apparatus is provided. That cargo cover apparatus comprises a housing, a cover retracting mechanism held in the housing and a cargo cover incorporating an integral storage compartment. The cargo cover is selectively displaceable between a storage position retracted within the housing and a cargo concealing position extending from the housing rearwardly, behind the rear seat so as to overlie the cargo area of the motor vehicle.

In one possible embodiment, the cover retracting mechanism includes a roller upon which the cover is wound when retracted and unwound when extended and a drive element for retracting the cover. In one possible embodiment, that drive element comprises a torsion spring.

In any of the embodiments, the cover may include a flap and a cooperating access opening in communication with the integral storage compartment. In one possible embodiment, the integral storage compartment includes a collapsible sidewall. In one possible embodiment, the integral storage compartment is formed by a flexible storage net that depends from an underside of cover. The flap includes a fastener for securing the flap in a closed position over the access opening. In one possible embodiment, the fastener is a hook and loop fastener. In another possible embodiment, the fastener is a zipper. In yet another possible embodiment, the fastener is a snap fastener.

In accordance with an additional aspect, a method is disclosed for providing additional small item storage in a motor vehicle. That method may be broadly described as comprising the steps of: (a) providing a retractable cargo cover displaceable between a storage position retracted within a housing and a cargo concealing position extending from the housing and (b) depending a collapsible storage compartment from an underside of the retractable cargo cover for storing small items when the cargo cover is in the cargo concealing position. In one possible embodiment, the method further includes collapsing the collapsible storage compartment prior to displacing the retractable cargo cover from the cargo concealing position to the storage position. Further, the method may include winding the retractable cargo cover and the collapsible storage compartment onto a roller when displacing the retractable cargo cover into the storage position.

In the following description, there are shown and described several preferred embodiments of the cargo cover apparatus. As it should be realized, the cargo cover apparatus is capable of other, different embodiments and its several details are capable of modification in various, obvious aspects all without departing from the cargo cover apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo cover apparatus and together with the description serve to explain certain principles thereof. In the drawing figures:

In FIG. 1, the cargo cover is illustrated in the cargo concealing position with the flap covering the access opening to the storage compartment held in the closed position.

Reference will now be made in detail to the present preferred embodiments of the cargo cover apparatus, examples of which are illustrated in the accompanying drawing figures.

DETAILED DESCRIPTION

Figure 1:
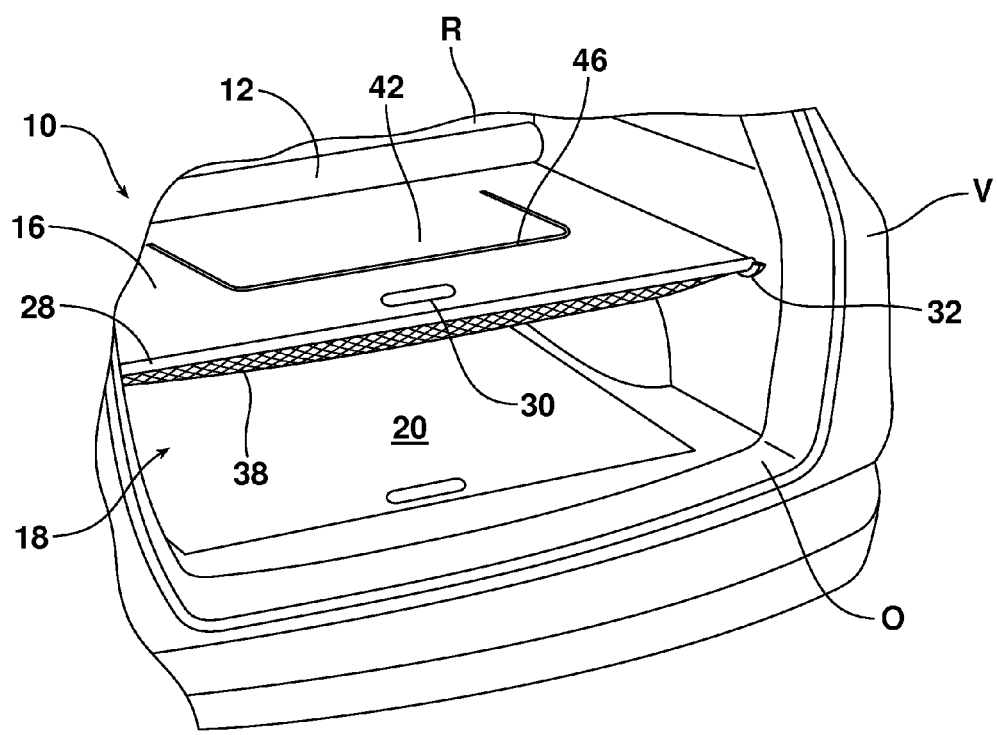
FIG. 1 is a perspective view of a motor vehicle equipped with the cargo cover apparatus that is the subject matter of this document.
Figure 2:
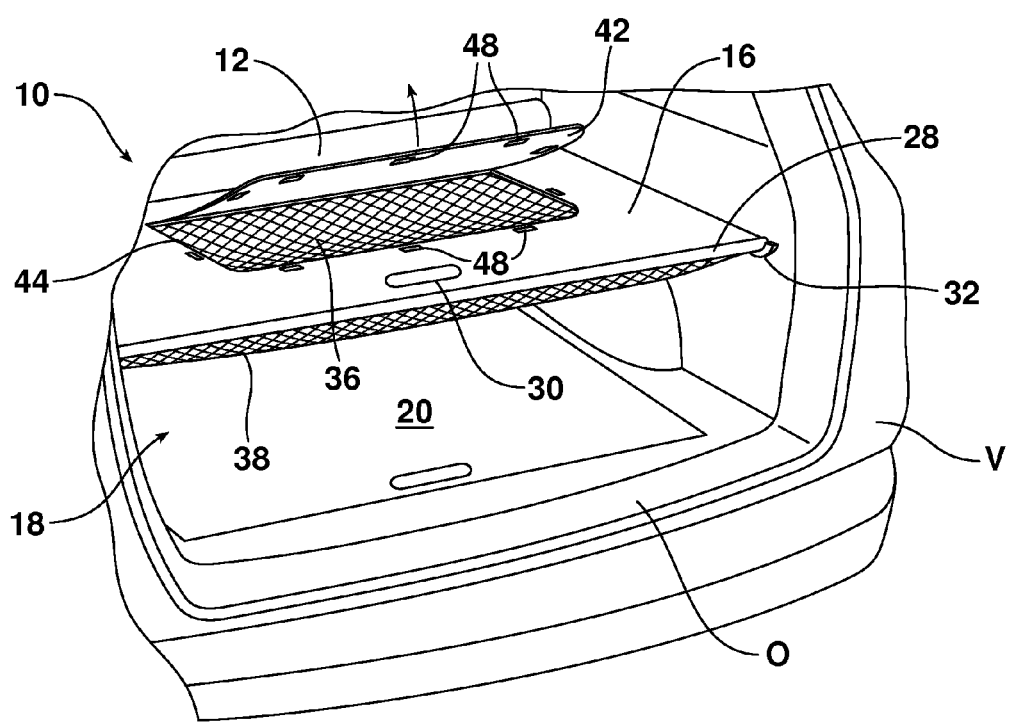
FIG. 2 is a view similar to FIG. 1 but showing the flap in the open position and further illustrating the flexible net of the cargo compartment through the access opening in the cover.
Figure 3:
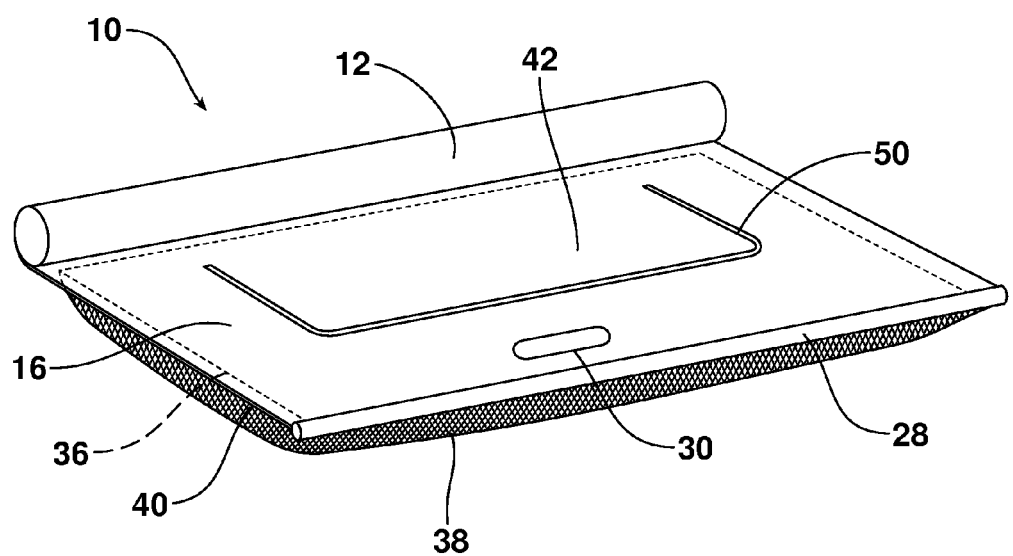
FIG. 3 is a detailed perspective view of the cargo cover apparatus with the cover extended from the housing in the cargo concealing position.
Figure 4:
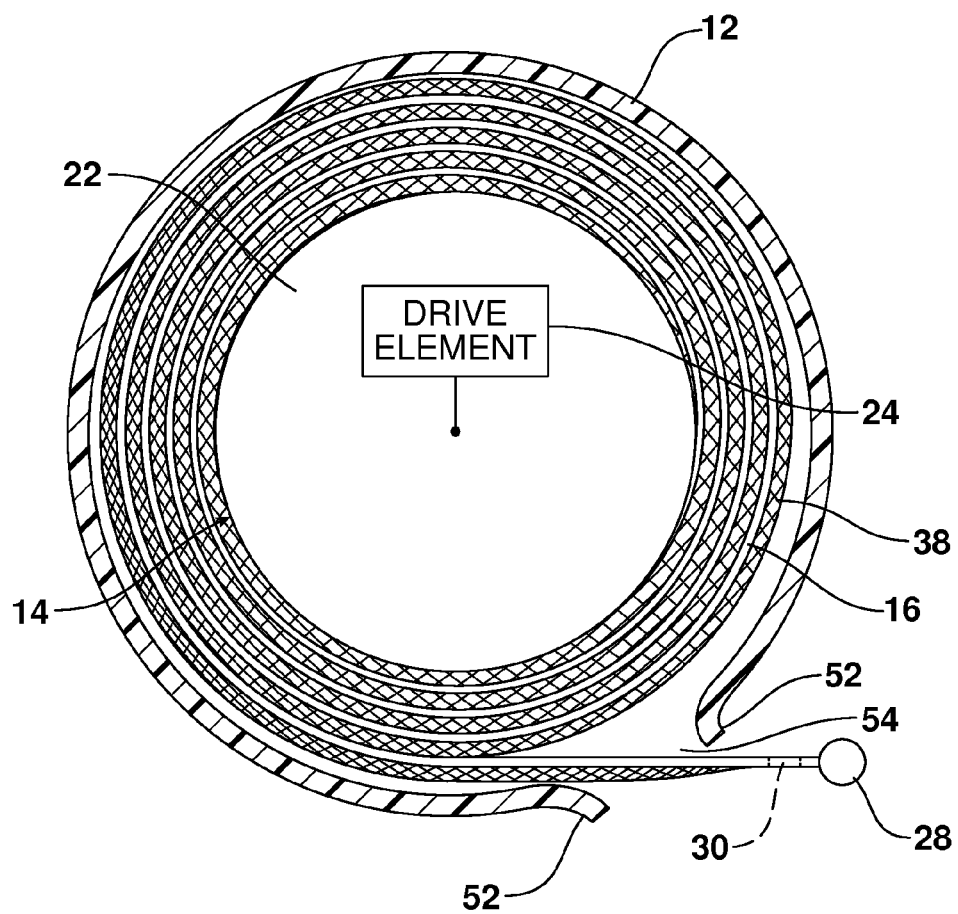
FIG. 4 is a schematic side elevational view illustrating the cover in the fully retracted or storage position wherein both the cover and the flexible/collapsible cargo storage compartment are wound onto a roller of the cover retracting mechanism that is held in the housing.

Reference is now made to FIGS. 1-4 illustrating a motor vehicle V equipped with the cargo cover apparatus 10 that is the subject matter of this document. As best illustrated in FIGS. 1 and 4, the cargo cover apparatus 10 includes a cassette or housing 12, a cover retracting mechanism, generally designated by reference numeral 14, and a cargo cover 16. As will be described in greater detail below, the cargo cover 16 is selectively displaceable between a storage position wherein the cover is retracted within the housing 12 (note FIG. 4) and a cargo concealing position wherein the cover extends from the housing 12 rearwardly from the rear seat R of the motor vehicle V toward the liftgate opening O at the rear of the vehicle. Thus, when in the cargo concealing position, the cover 16 overlies the cargo storage area 18 including that portion of the cargo floor 20 extending from the rear seat R to the liftgate opening O.

More specifically, the cover retracting mechanism 14 is of a type generally known in the art. Such a mechanism 14 includes a roller 22 upon which the cover 16 is wound when retracted and unwound when extended and a rotary drive element 24 which may take the form of torsion spring. The rotary drive element 24 torsionally biases the roller 22 to generate a tension acting on the cover 16 tending to pull the cover into the housing 12.

The cargo cover 16, which may be made from a flexible sheet of material, is attached to the roller 22 at its proximal end and wound around a bar 28 at its distal end. A handle opening 30 is provided in the cover 16 adjacent to the bar 28 at approximately the midpoint of the bar. The handle 30 allows an operator to engage the cover 16 to extend or withdraw it from the housing 12 so that the cover may be displaced from the storage position to the extended, cargo concealing position where the ends of the bar 28 are secured in sockets 32 on opposing sidewalls 34 of the motor vehicle V (only one socket is visible in FIG. 1).

When one desires to return to the cargo cover 16 to the storage position, one again engages the handle 30, lifts the bar 28 from the sockets 32 and allows the rotary drive element/torsion spring 24 to wind the flexible cover onto the roller 22 in the housing 12 (see FIG. 4).

Significantly, the cargo cover 16 of the apparatus 10 incorporates an integral storage compartment generally designated by reference numeral 36. The storage compartment 36 includes a collapsible sidewall which, in the illustrated embodiment, is formed by a flexible storage net 38 that depends from an underside 40 of the flexible cover 16.

As further illustrated, the cover 16 includes a flap 42 and a cooperating access opening 44 in communication with the integral storage compartment 36. The flap 42 is illustrated in a closed position in FIG. 1. In the FIG. 1 embodiment, the flap 42 includes a fastener in the form of a zipper 46 which is zipped to secure the flap in a closed position and unzipped to allow the flap to be opened. FIG. 2 illustrates the flap 42 in the open position so that one may access the integral storage compartment 36 through the, now exposed, access opening 44. In the FIG. 2 embodiment, the flap 42 includes a cooperating hook and loop fastener 48 which may be used to secure the flap in the closed position.

In the embodiment illustrated in FIG. 3, the flap 42 includes cooperating magnetic fasteners 50 that may be utilized to secure the flap in the closed position. These magnetic fasteners 50 may comprise a flexible tape that is provided continuously around the access opening 44. In an alternative embodiment, the cooperating magnetic fasteners may be provided at spaced locations around the access opening.

When the cargo cover 16 is in the extended or cargo concealing position with the flap 42 opened as illustrated in FIG. 2, it should be appreciated that it is relatively easy for an individual to position small groceries or other items in the integral storage compartment 36 depending from the underside of 40 of the cargo cover. This is true whether one is trying to access the storage compartment 36 from the open liftgate, an open lift glass on the liftgate or the rear seat R of the motor vehicle. Similarly, one may easily remove any desired item from that integral storage compartment 36. All such actions require a short reach downward through the access opening 44 in the cover 16 into the storage net 38. That is a much shorter distance than having to reach all the way down to the floor 20 of the storage area 18.

It should also be appreciated that the flexible, resilient net 38 may include an elastic material causing it to exert a gentle but positive pressure on any items held in the net. This tends to prevent those items from shifting during vehicle operation thereby preventing potential damage thereto.

When one desires to return the cargo cover 16 to the storage position from the extended cargo concealing position, one empties the integral storage compartment 36, closes the flap 42, uses the handle 30 to lift the ends of the bar 28 from the opposed sockets 32 and allows the drive element/torsion spring 24 to wind the cargo cover 16 on the roller 22 within the housing 12. As this is done, the flexible storage net 38 engages the converging lip walls 52 at the top and bottom of housing cover opening 54 so that the flexible cover 16 and the flexible storage net 38 are both wound onto the roller 22 in a smooth and efficient manner until the cover is in the storage position with the bar 28 and handle 30 exposed outside of the housing 12. See FIG. 4. Thus, the bar 28 and handle 30 remain available for easy access by the operator whenever the operator desires to return the cover 16 to the extended cargo concealing position.

In summary, the cargo cover apparatus 10 disclosed in this document provides a number of benefits and advantages. Advantageously, the integral storage compartment 36 of the cover 16 functions as a convenient storage compartment for small, fragile items such as eggs, light bulbs and the like. Any item stored in the integral storage compartment 36 is relatively easily accessed by opening the flap 42 and reaching through the access opening 44. This may be accomplish without ergonomic difficulty through an open liftgate, an open lift glass on the liftgate or even from the rear vehicle seat R for most individuals.

As should be appreciated, the cargo cover apparatus 10 described in this document also functions in accordance with a method of providing additional small item storage in a motor vehicle. That method includes the steps of: (a) providing a retractable cargo cover 16 that is displaceable between a storage position retracted within a housing 12 and a cargo concealing position extending from the housing and (b) depending a collapsible storage compartment 36 from an underside 40 of the retractable cargo cover for storing small items when the cargo cover is in the cargo concealing position.

As described and illustrated, that method may further include the collapsing of the collapsible storage compartment 36 prior to displacing the retractable cargo cover 16 from the cargo concealing position illustrated, for example, in FIGS. 1-3 to the cargo storage position illustrated in FIG. 4. Further, the method may include winding the retractable cargo cover 16 and the collapsible storage 36 onto a roller 22 when displacing the retractable cargo cover into the storage position (see FIG. 4).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cargo cover apparatus for a motor vehicle having a rear seat, comprising:
    a housing;
    a cover retracting mechanism held in said housing; and
    a cargo cover incorporating an integral storage compartment formed by a flexible storage net that depends from an underside of said cover, said flexible storage net configured to exert a gentle but positive pressure on any items held in the net, said cargo cover includes a flap and a cooperating access opening in communication with said integral storage compartment and said cargo cover being displaceable between a storage position retracted within said housing and a cargo concealing position extending from said housing,
    whereby said integral storage compartment is configured to be accessible from the rear seat via the flap.

2. The apparatus of claim 1, wherein said cover retracting mechanism includes a roller upon which said cover is wound when retracted and unwound when extended and a drive element for retracting said cover.

3. The apparatus of claim 2, wherein said drive element is a torsion spring.

4. The apparatus of claim 1, wherein said integral storage compartment includes a collapsible sidewall.

5. The apparatus of claim 4, wherein said flap includes a fastener for securing said flap in a closed position over said access opening.

6. The apparatus of claim 5, wherein said fastener is a hook and loop fastener.

7. The apparatus of claim 5, wherein said fastener is a zipper.

8. The apparatus of claim 5, wherein said fastener is a magnetic fastener.

9. A method of providing additional small item storage in a motor vehicle having a rear seat, comprising:
    providing a retractable cargo cover displaceable between a storage position retracted within a housing and a cargo concealing position extending from said housing;
    depending a collapsible storage compartment formed by a flexible storage net that depends from an underside of said retractable cargo cover for storing small items when said cargo cover is in said cargo concealing position such that said collapsible storage compartment is accessible from the rear seat; and
    providing said flexible storage net with an elastic material configured to exert a gentle but positive pressure on the small items stored within the net.

10. The method of claim 9, including collapsing said collapsible storage compartment prior to displacing said retractable cargo cover from said cargo concealing position to said storage position.

11. The method of claim 10, including winding said retractable cargo cover and said collapsible storage compartment onto a roller when displacing said retractable cargo cover into said storage position.

* * * * *